(12) United States Patent
Hensley

(10) Patent No.: US 8,317,444 B1
(45) Date of Patent: Nov. 27, 2012

(54) MOVEMENT-COMPENSATING PLATE ANCHOR

(75) Inventor: Lester Hensley, Westborough, MA (US)

(73) Assignee: Emseal Joint Systems LTD, Westborough, MA (US)

( * ) Notice: Subject to any disclaimer, the term of this patent is extended or adjusted under 35 U.S.C. 154(b) by 274 days.

(21) Appl. No.: 12/730,527

(22) Filed: Mar. 24, 2010

Related U.S. Application Data

(60) Provisional application No. 61/162,839, filed on Mar. 24, 2009.

(51) Int. Cl.
  *F16B 35/04* (2006.01)
(52) U.S. Cl. ............................ 411/107; 52/393; 52/573.1
(58) Field of Classification Search .................. 411/107, 411/82; 52/393–402, 573.1
  See application file for complete search history.

(56) References Cited

U.S. PATENT DOCUMENTS

| | | | | |
|---|---|---|---|---|
| 3,372,521 | A * | 3/1968 | Thom | 52/395 |
| 3,670,470 | A * | 6/1972 | Thom | 52/395 |
| 3,677,145 | A * | 7/1972 | Wattiez | 404/47 |
| 5,094,057 | A * | 3/1992 | Morris | 52/511 |
| 5,572,920 | A * | 11/1996 | Kennedy et al. | 92/128 |
| 6,014,848 | A * | 1/2000 | Hilburn, Jr. | 52/396.04 |
| 6,499,265 | B2 * | 12/2002 | Shreiner | 52/393 |
| 7,114,899 | B2 * | 10/2006 | Gass et al. | 411/107 |
| 7,748,310 | B2 * | 7/2010 | Kennedy | 92/171.1 |

* cited by examiner

*Primary Examiner* — Flemming Saether
(74) *Attorney, Agent, or Firm* — Michaud-Kinney Group LLP

(57) ABSTRACT

A system for anchoring a cover plate over an interface formed between substantially coplanar substrates includes a sleeve capable of being anchored in a first substrate; a spring located in the sleeve; a bolt located in communication with the spring; and a nut threaded onto the bolt. A head of the bolt is located in the sleeve, and an end of the bolt opposite the head of the bolt extends out of the sleeve to receive the nut. The nut is threaded onto the bolt over the cover plate located on the first substrate such that the cover plate extends over the interface formed between the first and second substrates when they are positioned to be substantially coplanar.

20 Claims, 4 Drawing Sheets

MOVEMENT-COMPENSATING PLATE ANCHOR

CROSS REFERENCE TO RELATED APPLICATION

This application claims the benefit of U.S. Provisional Patent Application No. 61/162,839, filed on Mar. 24, 2009, the contents of which are incorporated herein by reference in their entirety.

TECHNICAL FIELD

The present invention is generally directed to joint systems, and more particularly, to cover plates for use with expansion and seismic joint systems in building and construction applications.

BACKGROUND

Building and construction applications in which materials such as concrete, metal, and glass are used typically employ joint systems that accommodate movement due to thermal expansion and/or seismic effects. These joint systems may be positioned to extend through both the interior and exterior surfaces (e.g., walls, floors, and roofs) of a building or other structure. In the case of an exterior joint in a wall, roof, or floor exposed to external environmental conditions, the joint system may also, to some degree, resist the effects of such conditions. Particularly with regard to horizontally-oriented joints in parking garages and the like, the joints are designed to resist rain, standing water, snow, ice, debris such as sand, and in some circumstances several of these at the same time as well as the effects of traffic. Horizontally-oriented joints subjected to pedestrian and/or vehicular traffic and designed to withstand such traffic generally incorporate cover plates that are positioned over the joints to protect the materials of the joint system against the environmental conditions and to allow for smooth traffic flow. Such cover plates may also be positioned over spaces, holes, or structural gaps where there is no material to be protected but to allow for smooth traffic flow. The cover plates are typically steel or material of similar durability.

In anchoring the cover plates across joints or structural gaps in concrete or other structural surfaces which may experience movement such as thermal expansion and/or seismic effects, the cover plate is attached on one side of the joint or structural gap so as to allow the structural elements beneath the plate to expand and contract and otherwise move as a consequence of the thermal and seismic forces as well as dynamic load transfer. Cover plates are also utilized in applications involving the securing of any other element that incorporates a mounting plate (such as a sign) to a substrate where wind or other forces will cause a load on the mounting plate or in the fasteners securing the mounting plate. In such applications, stresses are induced in the anchoring fasteners. These stresses can cause conventional fasteners to fail in various ways. For example, fasteners can loosen, pull out of the substrate, or damage the substrate. Stresses can also cause deformation of a cover plate as a consequence of being too firmly restrained by the fasteners.

SUMMARY

In one aspect, the present invention resides in a system for anchoring a cover plate over an interface formed between substantially coplanar substrates. The system comprises a sleeve capable of being anchored in a first substrate; a spring located in the sleeve; a bolt located in communication with the spring; and a nut threaded onto the bolt. A head of the bolt is located in the sleeve, and an end of the bolt opposite the head of the bolt extends out of the sleeve to receive the nut. The nut is threaded onto the bolt over the cover plate located on the first substrate such that the cover plate extends over the interface formed between the first and second substrates when they are positioned to be substantially coplanar.

In another aspect, the present invention resides in a system for covering a gap or joint between two substantially coplanar substrates. The system comprises a cover plate locatable over a gap between first and second substrates that are arranged to be substantially coplanar and a system for anchoring the cover plate to the first substrate. The system for anchoring the cover plate comprises a sleeve located in the first substrate; a spring located in the sleeve; a bolt located in communication with the spring; and a nut threaded onto the bolt extending through the cover plate. A head of the bolt is located in the sleeve. Upon tightening the nut onto the bolt, the cover plate is secured in place over the gap, and the substrates are able to move relative to each other in substantially coplanar directions.

In another aspect, the present invention resides in an anchor for anchoring a cover plate over a gap or joint formed between coplanar substrates. The anchor comprises a sleeve located in a first substrate; a spring located in the sleeve; a bolt axially extending through the spring; and a nut threaded onto a portion of the bolt extending out of the spring. The cover plate can be located over the gap formed between the first substrate and a second substrate that define the coplanar substrates such that the bolt extending out of the sleeve is received through a hole in the cover plate. Upon tightening the nut onto the bolt, the cover plate is secured to the first substrate and over the gap. The substrates are then able to move relative to each other in substantially coplanar directions. Clearances between the spring, the bolt, and the sleeve also allow for movement of the first substrate and the second substrate in non-coplanar directions.

DETAILED DESCRIPTION

Figure 1:
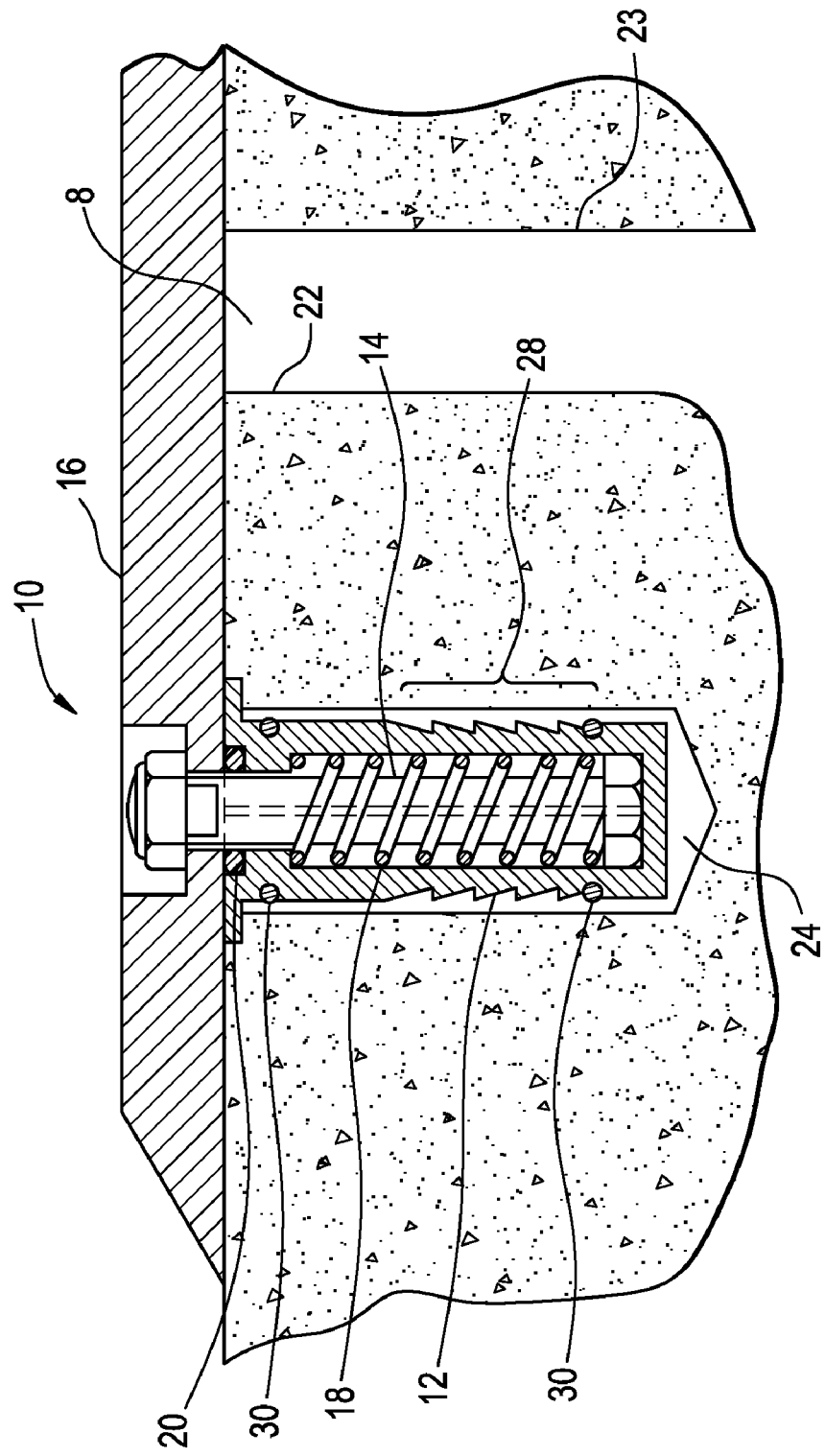
FIG. 1 is a side sectional view of a system for anchoring plates over an expansion joint or gap.

As is shown in FIG. 1, a system for anchoring plates over an interface 8 (hereinafter referred to as an expansion joint, a joint, or a gap) formed between two coplanar substrates forming a structure and compensating for structural movement of the substrates is shown generally at 10 and is hereinafter referred to as "system 10." The two substantially coplanar substrates may be the floor of a parking garage or other structure. However, the present invention is not limited in this regard as the two coplanar substrates may define any structure. Furthermore, although the embodiments described herein refer to horizontal surfaces, the present invention is also applicable to vertical surfaces.

System 10 comprises a sleeve 12 in which a bolt 14 and a spring 18 are retained such that the bolt extends through the spring and one end of the bolt extends from one end of the sleeve. The sleeve 12 may be anchored to the walls defining a hole in a horizontally oriented surface of the structure such as a concrete substrate 22. The end of the bolt 14 extending from the sleeve 12 extends through a cover plate (hereinafter "plate 16") which is positioned proximate the edge of the concrete substrate 22 and across a joint or gap (e.g., the interface 8) formed between the concrete substrate and a second concrete substrate 23. An O-ring 20 or similar device is located at the interface of the plate 16 and the surface of the concrete substrate 22 to limit or inhibit the passage of moisture and/or debris from the surface of the concrete substrate and/or the plate to the bolt 14 and spring 18.

The hole in the concrete substrate 22 in which the sleeve 12 is anchored may be drilled or otherwise formed therein subsequent to forming the concrete substrate and prior to constructing the structure. In the alternative, the hole can be formed during forming of the concrete substrate 22. The present invention is not limited to the use of the system 10 in structures employing concrete substrates 22, however, as the substrates may be formed using other materials.

The sleeve 12 may be anchored to the walls of the hole in the concrete substrate 22 using an adhesive 24. The adhesive 24 may be cementitious grout, elastomeric resin, epoxy, or any other material that facilitates the anchoring of the sleeve 12 into the concrete substrate 22, thereby locking the system 10 in place. The present invention is not limited to the use of the adhesive 24 to anchor the sleeve 12 to the walls of the hole, however, as the sleeve may also be configured such that an interference fit can be achieved by driving the sleeve into the hole, thereby frictionally retaining the system 10 in the concrete substrate 22. Irrespective of the configuration used, at least a portion of the outer surface of the sleeve 12 includes ridges 28 that facilitate the anchoring of the sleeve in the concrete substrate 22.

The sleeve 12 is machined or swaged or otherwise manufactured as one part. The sleeve 12 is not limited to being manufactured as one part, however, as the sleeve may comprise two or more parts that can be assembled to receive and encapsulate the bolt 14 and the spring 18. When the sleeve 12 is constructed from multiple parts, the parts can be held together (thereby retaining the bolt 14 and the spring 18 therein) using bands 30, cable, or wire positioned and tightened around an outer surface 34 of the sleeve, a clip such as a spring clip, or any other suitable retaining mechanism.

Figure 2:
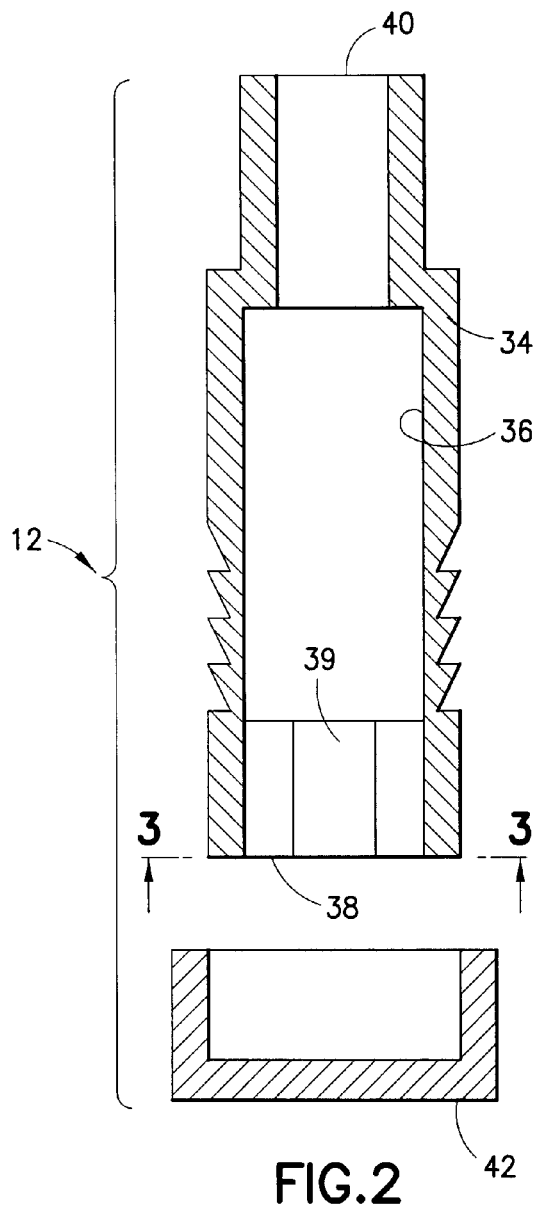
FIG. 2 is a side sectional view of a sleeve of the system of FIG. 1.

As is shown in FIG. 2, the sleeve 12 is substantially cylindrical in shape and is defined by the outer surface 34 and an inner surface 36. The sleeve 12 has a lower end 38 located within the concrete substrate 22 and an upper end 40 located at the surface of the concrete substrate. Furthermore, the lower end 38 of the sleeve 12 can be closed or capped by a cap 42 or the like frictionally fitted on the lower end. The present invention is not limited in this regard, however, as the outer surface of the lower end 38 of the sleeve 12 may be configured to threadedly receive the cap 42. In the alternative, the lower end 38 of the sleeve 12 may be closed during the manufacturing and/or assembly of the sleeve by the parts of the sleeve themselves.

Figure 3:
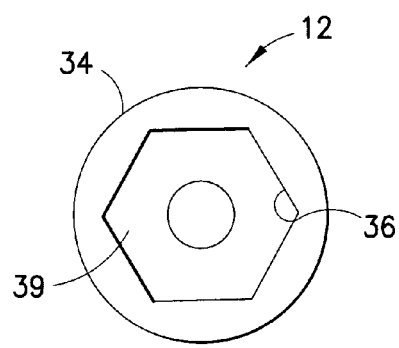
FIG. 3 is an end view of the sleeve of FIG. 2.

As is shown in FIGS. 2 and 3, at least a portion 39 of the inner surface 36 of the sleeve 12 is hexagonal in cross-sectional geometry to accommodate the head of the bolt. The outer surface 34 may be round or any other desired shape (e.g., square) suited for being retained on the walls of the hole in the concrete substrate 22.

Figure 4:
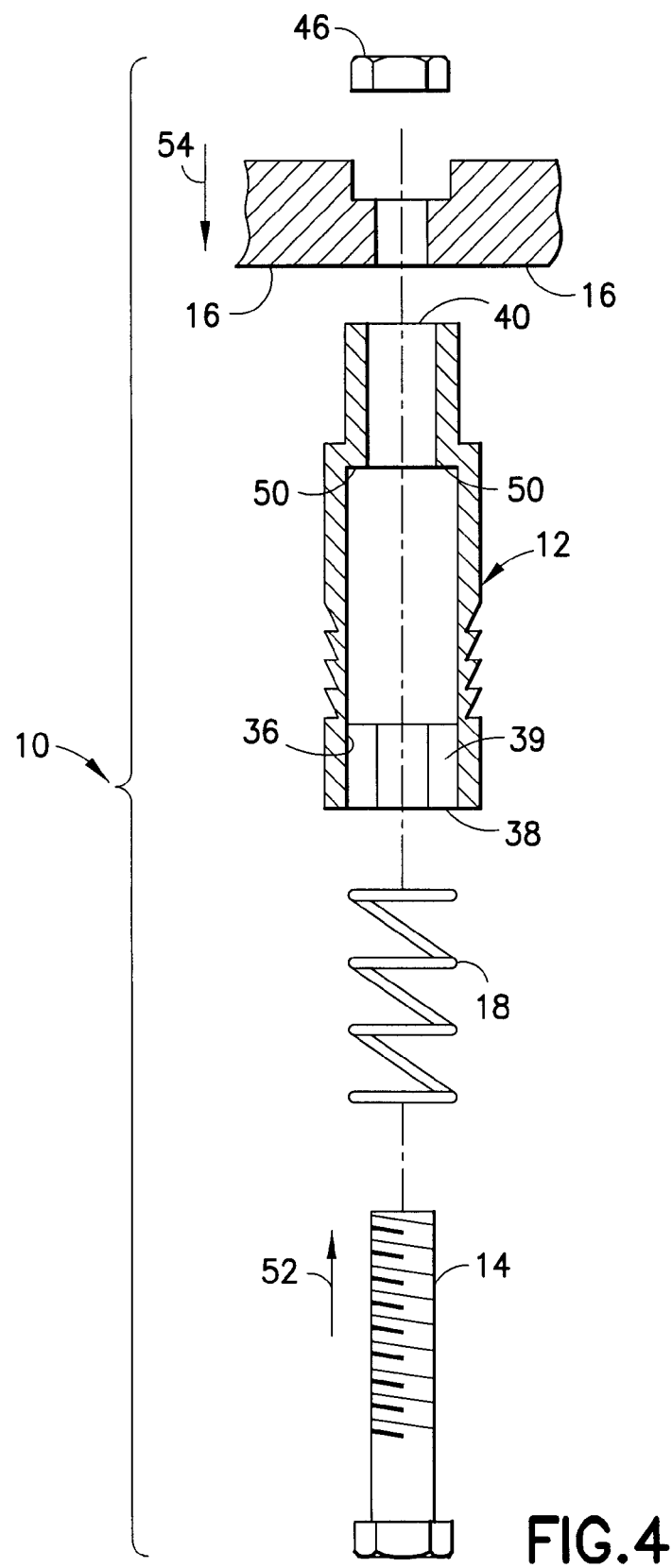
FIG. 4 is an exploded side sectional view of the system of FIG. 1.

As is shown in FIG. 4, the bolt 14 is received in the lower end 38 of the sleeve 12. Because at least a portion of the inner surface 36 of the sleeve 12 is defined by a hexagonal shape, and because a head 44 of the bolt 14 received in the portion 39 of the sleeve is also defined by a hexagonal shape, surfaces on the head 44 of the bolt 14 engage corresponding surfaces in the portion 39 of the sleeve, thereby preventing rotation of the bolt within the sleeve. Because the bolt 14 is prevented from rotation in the sleeve 12, a nut 46 can be tightened down on the bolt from the upper end 40 of the sleeve during installation of the system 10. The nut 46 can be tightened only enough to pull the head 44 of the bolt 14 upward to fully compress the spring 18 and such that the head of the bolt remains in the portion 39 of the sleeve with the inner surface 36 defined by the hexagonal shape. The present invention is not limited to the use of hexagonal shapes on the head 44 of the bolt 14 and on the inner surface 36 of the sleeve 12, however, as other shapes are within the scope of the present invention. Other shapes that may be used include square, pentagonal, octagonal shapes, and the like. In the alternative, or in addition to the use of hexagonal or other shapes, a pin or the like can be inserted laterally through the sleeve 12 and the bolt 14 to prevent the bolt from turning in the sleeve.

Axial movement of the bolt 14 within the sleeve 12 is controlled by the spring 18. The spring 18 as shown in the illustrated embodiment is a coil spring that is received into the lower end 38 of the sleeve 12 such that one end thereof is abutted against a shoulder 50 extending circumferentially around the inner surface 36 of the sleeve. When the bolt 14 is located through the spring 18 and made to extend through the plate 16, the bolt is prevented from rotation in the sleeve 12 by the engagement of the hexagonally-shaped head 44 with the hexagonally-shaped portion 39 of the inner surface 36. The nut 46 can then be tightened, thereby pulling the bolt in the direction indicated by arrow 52 and compressing the spring against the shoulder 50 while simultaneously pulling the plate 16 in the direction indicated by arrow 54 against the concrete substrate 22 to secure the plate. A force is thereby applied to the system 10, thereby controlling and/or reducing movement of the plate 16 relative to the plane of attachment thereof to the concrete substrate 22.

Attachment of the plate 16 to the concrete substrate 22 using system 10 permits the plate to move to some degree in the direction indicated by arrow 52 relative to the concrete substrate (for example, due to frost heave) as long as the spring 18 can be further compressed. The concrete substrate 22 with the plate 16 can also move (to some degree) up, down, laterally, or in combinations thereof relative to an adjacent concrete substrate. One side of the plate 16 can also, through suitable clearances within the system 10 itself, lift away from the upper surface of the concrete substrate 22, for example, by movement of one side of the structure comprising the adjacent concrete substrate, thus causing the bolt 14 to deflect the spring 18 within the sleeve 12. When any of the foregoing movements occur, or when other forces cause movement resulting in the application of stress to the plate 16, the bolt 14 moves against the surrounding spring 18, thereby relieving the stress and preventing distortion of or damage to the plate or concrete substrate 22 in the proximity of the hole in which the system 10 is anchored. Clearances between the bolt 14 and the spring 18 as well as the spring and the sleeve 12 mitigate the stresses induced by the movement of the bolt. Such movement of the bolt 14 may occur as a result of temperature changes, seismic events, wind, rain, or weather-related phenomenon as well as through loading from vehicles or other traffic passing, stopping, or accelerating from a stationary position over the system or the plate 16.

Figure 5:
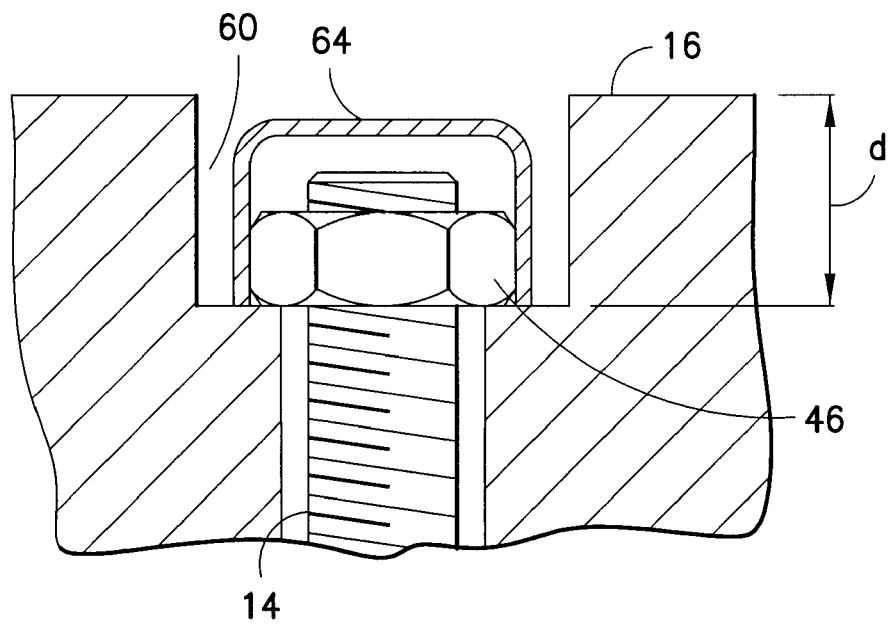
FIG. 5 is a side sectional view of a nut located in a channel of a cover plate of the system of FIG. 1.

As is shown in FIG. 5, the nut 46 is used to retain the plate 16 on the concrete substrate 22. The nut 46 may be a lock nut or the like. The bolt 14 is also configured and sized to be received through the plate 16 and in a channel 60 or other recess in the exposed face of the plate 16 such that upon tightening the nut onto the bolt, the nut or the portion of the bolt 14 extending through the nut does not interfere with traffic on the plate and further such that the nut can be accessed (e.g., for removal or tightening) as desired. In particular, the nut 46 fits far enough into the channel 60 (and the bolt 14 does not protrude out of the channel) so as to not detrimentally affect rolling or foot traffic and to allow a suitable tool to engage the nut. As is shown, a height of the tightened nut 46 on the protruding bolt 14 is less than a depth d of the channel 60. A cap 64 or other device may be frictionally fit over the nut 46 to prevent sand, water, or debris from coming into direct contact with the nut.

Although the movement-compensating plate anchor has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A system for anchoring a cover plate over an interface formed between coplanar substrates, the system comprising:
    a sleeve anchorable in a first substrate;
    a spring located in the sleeve;
    a bolt located in communication with the spring, a head defined by the bolt being located in the sleeve, and an end of the bolt opposite the head extending out of the sleeve; and
    a nut threaded onto a portion of the bolt extending out of the sleeve;
    wherein the nut is threaded onto the bolt over a cover plate located on the first substrate, the cover plate extending over an interface formed between the first substrate and a second substrate positioned substantially coplanar to the first substrate.

2. The system of claim 1, wherein at least a portion of an inner surface of the sleeve comprises a cross-sectional geometry that corresponds to a cross-sectional geometry of the head of the bolt.

3. The system of claim 2, wherein the cross-sectional geometry of the portion of the inner surface of the sleeve and the cross-sectional geometry of the head of the bolt is hexagonal.

4. The system of claim 1, wherein the sleeve comprises a shoulder on an inner surface of the sleeve against which the spring can be compressed upon tightening of the nut on the bolt.

5. The system of claim 1, further comprising an O-ring located on the sleeve and positioned at a surface of the first substrate.

6. The system of claim 1, wherein the sleeve comprises at least two parts held together with a retaining mechanism.

7. The system of claim 1, further comprising an adhesive for anchoring the sleeve in the first substrate.

8. The system of claim 1, wherein the sleeve is anchorable in the first substrate using an interference fit.

9. A system for covering a gap between two substantially coplanar substrates, the system comprising:
    a cover plate locatable over a gap defined between a first substrate and a second substrate substantially coplanar with the first substrate;
    a system for anchoring the cover plate to the first substrate, the system comprising,
        a sleeve located in the first substrate;
        a spring located in the sleeve;
        a bolt located in communication with the spring, a head defined by the bolt being located in the sleeve, and an end of the bolt opposite the head of the bolt extending out of the sleeve and through the cover plate; and
        a nut threaded onto a portion of the bolt extending through the cover plate;
    wherein tightening of the nut onto the bolt secures the cover plate in place over the gap and allows the first substrate and the second substrate to move relative to each other in substantially coplanar directions.

10. The system of claim 9, wherein at least a portion of an inner surface of the sleeve comprises a cross-sectional geometry that corresponds to a cross-sectional geometry of the head of the bolt.

11. The system of claim 10, wherein the cross-sectional geometry of the portion of the inner surface of the sleeve and the cross-sectional geometry of the head of the bolt is hexagonal.

12. The system of claim 9, wherein the spring is compressed upon tightening of the nut on the bolt.

13. The system of claim 9, further comprising an O-ring located on the sleeve and positioned at a surface of the first substrate.

14. The system of claim 9, wherein the sleeve is anchored in the first substrate using an adhesive.

15. The system of claim 9, wherein the sleeve is anchored in the first substrate using an interference fit.

16. The system of claim 9, wherein the cover plate includes a hole through which the bolt extends, the hole being formed in a recess in a face of the cover plate.

17. An anchor for anchoring a cover plate over a gap formed between substantially coplanar substrates, the anchor comprising:
    a sleeve located in a first substrate;
    a spring located in the sleeve;
    a bolt axially extending through the spring, one end of the bolt extending out of the sleeve; and
    a nut threaded onto the bolt;
    wherein a cover plate can be located over a gap formed between the first substrate and a second substrate arranged to define substantially coplanar substrates such that the bolt extending out of the sleeve is received through a hole in the cover plate;
    wherein tightening of the nut onto the bolt secures the cover plate to the first substrate and over the gap and allows the first substrate and the second substrate to move relative to each other in substantially coplanar directions; and
    wherein clearances between the spring, the bolt, and the sleeve allow for movement of the first substrate and the second substrate in non-coplanar directions.

18. The anchor of claim 17, wherein at least a portion of an inner surface of the sleeve comprises a hexagonal cross-sectional geometry that corresponds to a hexagonal cross-sectional geometry of a head defined by the bolt located in the sleeve.

19. The anchor of claim 17, wherein the tightening of the nut onto the bolt compresses the spring between a head defined by the bolt in the sleeve and a shoulder formed on an inner surface of the sleeve.

20. The anchor of claim 17, further comprising an adhesive in which the sleeve is located in the first substrate.

* * * * *